United States Patent
Lu et al.

(10) Patent No.: US 10,904,712 B2
(45) Date of Patent: Jan. 26, 2021

(54) METHOD AND APPARATUS FOR FACILITATING MULTICAST COMMUNICATION

(71) Applicant: Telefonaktiebolaget LM Ericsson (publ), Stockholm (SE)

(72) Inventors: Qianxi Lu, Beijing (CN); Zhang Zhang, Beijing (CN); Stefano Sorrentino, Solna (SE); Marco Belleschi, Solna (SE); Henrik Enbuske, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 15/532,005

(22) PCT Filed: Mar. 14, 2017

(86) PCT No.: PCT/CN2017/076657
§ 371 (c)(1),
(2) Date: May 31, 2017

(87) PCT Pub. No.: WO2017/167012
PCT Pub. Date: Oct. 5, 2017

(65) Prior Publication Data
US 2018/0227718 A1 Aug. 9, 2018

(30) Foreign Application Priority Data
Apr. 1, 2016 (WO) ................ PCT/CN2016/078392

(51) Int. Cl.
*H04W 4/06* (2009.01)
*H04W 76/40* (2018.01)

(52) U.S. Cl.
CPC ............. *H04W 4/06* (2013.01); *H04W 76/40* (2018.02)

(58) Field of Classification Search
CPC ................................ H04W 4/06; H04W 76/40
See application file for complete search history.

(56) References Cited

U.S. PATENT DOCUMENTS

| | | | |
|---|---|---|---|
| 2013/0250771 A1 | 9/2013 | Yu et al. | |
| 2014/0064177 A1 | 3/2014 | Anchan | |
| (Continued) | | | |

FOREIGN PATENT DOCUMENTS

| | | |
|---|---|---|
| CN | 104936264 A | 9/2015 |
| WO | 2011060707 A1 | 5/2011 |
| (Continued) | | |

OTHER PUBLICATIONS

International Search Report and Written Opinion for Application No. PCT/CN2017/076657, dated Jun. 7, 2017, 9 pages.

(Continued)

*Primary Examiner* — Pao Sinkantarakorn
*Assistant Examiner* — Kabir Y Jahangir
(74) *Attorney, Agent, or Firm* — NDWE LLP

(57) ABSTRACT

Methods, apparatus and computer program products for improving multi-cast communication. A method implemented at a server comprises determining at least one cluster; determining a mapping between one of the at least one cluster and at least one bearer; indicating the determined mapping to a radio access network (RAN); and multicasting a message using a first bearer via the RAN, the first bearer being selected from the at least one bearer based on the mapping. With the disclosure, multi-cast services can be provided with more flexibly and higher efficiency.

20 Claims, 8 Drawing Sheets

(56) References Cited

U.S. PATENT DOCUMENTS

| | | | | |
|---|---|---|---|---|
| 2014/0080475 | A1* | 3/2014 | Gholmieh | H04W 48/16 |
| | | | | 455/422.1 |
| 2018/0035276 | A1* | 2/2018 | Kang | H04W 8/005 |
| 2018/0191551 | A1* | 7/2018 | Chun | H04W 76/27 |
| 2018/0206089 | A1* | 7/2018 | Cavalcanti | H04W 36/0083 |
| 2018/0213376 | A1* | 7/2018 | Pinheiro | H04W 76/14 |
| 2018/0324560 | A1* | 11/2018 | Xu | H04W 4/06 |
| 2018/0324757 | A1* | 11/2018 | Chai | H04W 56/001 |
| 2019/0124669 | A1* | 4/2019 | Luo | H04W 72/048 |

FOREIGN PATENT DOCUMENTS

| | | | |
|---|---|---|---|
| WO | 2012092097 | | 7/2012 |
| WO | 2012092250 | A1 | 7/2012 |
| WO | 2014193959 | A1 | 12/2014 |

OTHER PUBLICATIONS

"Proposed study on LTE-based V2X," Feb. 2-6, 2015, 6 pages, 3GPP TSG-SA WG1 Meeting #69, S1-150284, Sanya, P.R. China.
"New WID for Study on LTE support for V2X services (FS_V2XLTE), from S1-150284," Mar. 11-13, 2015, 6 pages, 3GPP TSG SA Meeting #67, SP-150051, Shanghai, RPC.
"3rd Generation Partnership Project; Technical Specification Group Services and System Aspects; Group Communication System Enablers for LTE (GCSE_LTE); Stage 2 (Release 13)," Dec. 2015, 30 pages, 3GPP TS 23.468, V13.3.0, 3GPP Organizational Partners.
"3rd Generation Partnership Project; Technical Specification Group Services and System Aspects; Study on LTE support for Vehicle to Everything (V2X) services (Release 14)," Dec. 2015, 50 pages, 3GPP TR 22.885, V14.0.0, 3GPP Organizational Partners.
3GPP TR 23.785 V0.2.0 (Feb. 2016), "Study on Architecture Enhancements for LTE support of V2X services," 3rd Generation Partnership Project; Technical Specification Group Services and System Aspects; (Release 14), Feb. 1, 2016; 21 pages.
CATT, "Discussion on V2X Architecture," 3GPP TSG RAN WG2 Meeting #93, Feb. 15-19, 2016, R2-161190, 3 pages.
Extended European Search Report for Application No. 17724714.5, dated Mar. 7, 2018, 9 pages.
ZTE, "Discussion on the eMBMS based V2X broadcast," 3GPP TSG RAN WG2 #93, Feb. 15-19, 2016, R2-161430, 5 pages.
ZTE, "Localized Uu based V2X Architecture concerning on eMBMS," 3GPP TSG-RAN WG3 #91, Feb. 15-19, 2016, R3-160206, 5 pages.
Communication under Rule 71(3) EPC for Application No. 17724714.5, dated Apr. 25, 2019, 88 pages.
Communication pursuant to article 94(3) EPC for Application No. 17724714.5, dated Nov. 15, 2018, 5 pages.
International Preliminary Report on Patentability for Application No. PCT/CN20171076657, dated Jul. 12, 2018, 4 pages.
Decision to grant for EP Application No. 17724714.5, dated Jul. 18, 2019, 2 pages.
Communication under Rule 71(3) EPC for EP Application No. 17724714.5, dated Apr. 25, 2019, 88 pages.

* cited by examiner

METHOD AND APPARATUS FOR FACILITATING MULTICAST COMMUNICATION

CROSS-REFERENCE TO RELATED APPLICATIONS

This application is a National stage of International Application No. PCT/CN2017/076657, filed Mar. 14, 2017, which claims priority to International Application No. PCT/CN2016/078392, filed Apr. 1, 2016, which are hereby incorporated by reference.

TECHNICAL FIELD

The non-limiting and exemplary embodiments of the present disclosure generally relate to the technical field of wireless communications, and specifically to methods, apparatus and computer programs for facilitating multicast transmission.

BACKGROUND

This section introduces aspects that may facilitate better understanding of the disclosure. Accordingly, the statements of this section are to be read in this light and are not to be understood as admissions about what is in the prior art or what is not in the prior art.

Some of the abbreviations used in the disclosure are listed in the following:
D2D device-to-device
NW network
ProSe Proximity-based Services
V2X Vehicle-to-Anything
V2V Vehicle-to-Vehicle
V2I Vehicle-to-Infrastructure
V2P Vehicle-to-Pedestrian
MBMS Multimedia Broadcast/Multicast Service
MBSFN MBMS Single-Frequency Network
PDSCH Physical Downlink Shared Channel
SC-PTM Single-Cell Point to Multipoint
USD User Service Description
TMGI Temporary Mobile Group Identity
LTE Long Term Evolution
eNB Evolved NodeB
UE User Equipment
AS Application Server
GCS Group Communication Service
MCPTT Mission Critical Push To Talk
ECGI E-UTRAN Cell Global Identifier
RRC Radio Resource Control
SIB System Information Block
BM-SC Broadcast Multicast-Service Centre
H-PLMN Home Public Land Mobile Network
RSRP Reference Signal Received Power
RSRQ Reference Signal Received With the evolution of wireless communication, a requirement for supporting device to device (D2D) communication (specified as "sidelink") features which targets at both commercial and Public Safety applications has been proposed. In the Third Generation Partnership Project (3GPP), the D2D communication feature has been introduced during the development of Release 12 of the Long term evolution (LTE) standard. An application enabled by Rel-12 LTE is device discovery, where a device is able to sense the proximity of another device and an associated application by broadcasting and detecting discovery messages that carry device and application identities. Another application consists of direct communication based on physical channels terminated directly between devices.

One of the potential extensions for the device to device work consists of support of V2X communication, which includes any combination of direct communication between vehicles, pedestrians and infrastructure. V2X communication may take advantage of a NW infrastructure, if available. However, at least a basic V2X connectivity should be possible even in case of lacking of NW coverage. Providing an LTE-based V2X interface may be economically advantageous because of the LTE economies of scale and it may enable tighter integration between communications with the NW infrastructure (V2I) and V2P and V2V communications, as compared to using a dedicated V2X technology.

V2X communications may carry both non-safety and safety information, where each of the applications and services may be associated with specific requirement sets, e.g., in terms of latency, reliability, capacity, etc.

LTE-based V2X study is urgently desired from market requirement, and the market for V2V communication in particular is time sensitive. There are many research projects and field tests of connected vehicles in some countries or regions, such as US/Europe/Japan/Korea. In China, the China Communications Standards Association (CCSA) has finished the feasible study for vehicle safety application based on TD-LTE in 2014 and started the series of industrial standard of communication based on LTE for vehicle application. Further, in March 2015, the frequency study of V2X also started in the CCSA and some vehicular industrial alliances in China. Based on the study, the National Regulatory Authority in China will allocate the frequency of connected vehicles.

In response to this situation, SA1 #69 recently agreed a new Rel-14 study on LTE support for V2X services to investigate the essential use cases and requirements for the following (S1-150284/SP-150051):
 V2V (vehicle-to-vehicle): covering LTE-based communication between vehicles.
 V2P (vehicle-to-pedestrian): covering LTE-based communication between a vehicle and a device carried by an individual (e.g. handheld terminal carried by a pedestrian, cyclist, driver or passenger).
 V2I/N (vehicle-to-infrastructure/network): covering LTE-based communication between a vehicle and a roadside unit/network. A roadside unit (RSU) is a transportation infrastructure entity (e.g. an entity transmitting speed notifications) implemented in an eNodeB or a stationary UE.

The SA1 study considers both safety services and non-safety services and the possibility of using existing LTE technologies for unicast/multicast/broadcast communication.

Also, R13 RAN SI is approved recently to start, with the objectives to evaluate new functionalities needed to operate LTE-based V2X (e.g. V2V, V2I/N, and V2P), and to investigate potential enhancements for vehicular services defined in [SA1 TR 22.885].

FIG. 1 illustrates a schematic V2X scenario based on a LTE network which includes an access node 101 in a form of an eNB and multiple devices (shown as 102-105). As shown in FIG. 1, a device can be a vehicle (e.g., 103-105, or, a vehicle-mounted wireless communication device), and it can communicate with other vehicles or persons nearby via radio communication, e.g., via D2D communication.

MBMS turns to be useful in V2X uses cases where certain road safety V2X messages need to be delivered in multicast to a large number of UEs. However, an efficient multicast communication solution for V2X is not available yet.

To enable an efficient multicast service, methods, apparatus and computer programs are provided herein. However, it would be appreciated that embodiments of the disclosure are not limited to be used only in the V2X use cases.

SUMMARY

Various embodiments of the present disclosure mainly aim at providing methods, apparatus and computer programs for facilitating reference signal transmission in a wireless communication system. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a server. The method comprises determining at least one cluster; determining a mapping between one of the at least one cluster and at least one bearer; indicating the determined mapping to a radio access network (RAN); and multicasting a message using a first bearer via the RAN. The first bearer is selected from the at least one bearer based on the mapping.

In one embodiment, the at least one cluster may be defined/determined based on at least one of the following: a geographical area, a cell identification and a signal quality, a device type, and a service type.

In another embodiment, the determined mapping may be indicated to the RAN by sending the determined mapping to at least one terminal device in the RAN via an interface between the at least one terminal device and the server or by sending the determined mapping to an access node of the RAN via a Broadcast Multicast-Service Centre (BM-SC).

In still another embodiment, the method may further comprise receiving the message from a source device. The multicasting of the message comprises selecting the first bearer from among the at least one bearer based on the mapping and at least one of a location of the source device and content of the message.

In one embodiment, the at least one bearer can be identified at least by one of: a Temporary Mobile Group Identity (TMGI), and the TMGI and a flow identifier (ID).

In another embodiment, the method may further comprise sending a definition of the at least one cluster to the RAN. In a further embodiment, sending the definition of the at least one cluster to the RAN may comprises: sending the definition of the at least one cluster to at least one terminal device in the RAN via an interface between the at least one terminal device and the server or sending the definition of the at least one cluster to an access node of the RAN via a BM-SC.

In a second aspect of the disclosure, there is provided a method implemented at a base station in a RAN. The method comprises determining at least one cluster; obtaining, from a server, a mapping between one of the at least one cluster and at least one bearer; receiving a message from the server over a first bearer; and sending the message to at least one terminal device using the first bearer. The first bearer is selected from the at least one bearer based on the mapping.

In one embodiment, the at least one cluster may be determined by determining the definition of the at least one cluster based on at least one of the following: a geographical area, a cell identification and a signal quality, a device type, and a service type.

In another embodiment, the mapping may be obtained by receiving the mapping via a BM-SC.

In one embodiment, the method may further comprise sending the mapping to the at least one terminal device.

In another embodiment, the sending of the mapping to the at least one terminal device may comprise sending to the at least one terminal device a geographical coordinate or a reference position associated with a second bearer.

In still another embodiment, determining the at least one cluster may comprise receiving the definition of the at least one cluster from the server.

In some embodiments, the method may further comprise sending the definition of the at least one cluster to the at least one terminal device.

In one embodiment, the method may further comprise obtaining, from the at least one terminal device, at least one of a location of the at least one terminal device and an identifier of a third bearer; and sending to the at least one terminal device an indicator of a fourth bearer for monitoring.

In another embodiment, sending the message to the at least one terminal device using the first bearer may comprise determining the at least one terminal device based on the mapping and at least one of a device type, a service type and a location of at least one terminal device.

In some embodiments, the at least one bearer may be identified at least based on one of: a Temporary Mobile Group Identity (TMGI), and the TMGI and a flow identifier (ID).

In a third aspect of the disclosure, there is provided a method implemented at a terminal device. The method comprises receiving information for determining a bearer to be monitored; determining the bearer to be monitored based on the information; and receiving a multicast message over the determined bear.

In one embodiment, the information for determining a bearer to be monitored may include at least one of: a mapping between one of at least one cluster and at least one bearer; and a definition of the at least one cluster.

In another embodiment, the information for determining a bearer to be monitored may be received via an interface between the terminal device and a server or from an access node of a RAN.

In still another embodiment, determining the bearer to be monitored based on the information may comprise determining a cluster to which the terminal device belongs; and determining the bearer to be monitored based on the received mapping and the determined cluster.

In some embodiments, the cluster may be determined based on a definition of the at least one cluster and at least one of one of a device type, a service type and a location of the terminal device.

In one embodiment, receiving the information for determining a bearer to be monitored further may comprise receiving an indicator of a bearer to be monitored from the access node; or receiving from the access node an indication of a geographical coordinate or a reference position associated with the bearer to the monitored.

In another embodiment, the bearer may be identified at least by one of: a Temporary Mobile Group Identity (TMGI), and the TMGI and a flow identifier (ID).

In still another embodiment, the method may further comprise transmitting, to an access node, at least one of a location of the at least one terminal device and an identifier of a third bearer.

In a fourth aspect of the disclosure, there is provided an apparatus in a server. The apparatus comprises a first cluster determining unit configured to determine at least one cluster; a mapping determining unit configured to determine a mapping between one of the at least one cluster and at least one bearer; a first mapping sending unit configured to indicate the determined mapping to a radio access network (RAN); and a multicasting unit configured to a message using a first bearer via the RAN, the first bearer being selected from the at least one bearer based on the mapping.

In a fifth aspect of the disclosure, there is provided an apparatus in a base station. The apparatus comprises a definition determining unit configured to determine at least one cluster; a first mapping receiving unit configured to obtain, from a server, a mapping between one of the at least one cluster and at least one bearer; a second message receiving unit configured to receive a message from the server over a first bearer, the first bearer being selected from the at least one bearer based on the mapping; and a message sending unit configured to send the message to at least one terminal device using the first bearer.

In a sixth aspect of the disclosure, there is provided an apparatus in a terminal device. The apparatus comprises a bearer information receiving unit configured to receive information for determining a bearer to be monitored; a bearer determining unit configured to determine the bearer to be monitored based on the information; and a third message receiving unit configured to receive a multicast message over the determined bear.

In a seventh aspect of the present disclosure, there is provided an apparatus in a wireless communication system. The apparatus comprises a processor and a memory. The memory may contain instructions executable by the processor whereby the apparatus is operative to perform the method according to the first aspect of the present disclosure.

In an eighth aspect of the present disclosure, there is provided an apparatus in a wireless communication system. The apparatus comprises a processor and a memory. The memory may contain instructions executable by the processor whereby the apparatus is operative to perform the method according to the second aspect of the present disclosure.

In a ninth aspect of the present disclosure, there is provided an apparatus in a wireless communication system. The apparatus comprises a processor and a memory. The memory may contain instructions executable by the processor whereby the apparatus is operative to perform the method according to the third aspect of the present disclosure.

In a tenth aspect of the disclosure, there is provided an apparatus in a wireless communication system. The apparatus comprises processing means adapted to perform any method in accordance with the first aspect of the disclosure.

In an eleventh aspect of the disclosure, there is provided an apparatus in a wireless communication system. The apparatus comprises processing means adapted to perform any method in accordance with the second aspect of the disclosure.

In a twelfth aspect of the disclosure, there is provided an apparatus in a wireless communication system. The apparatus comprises processing means adapted to perform any method in accordance with the third aspect of the disclosure.

In a thirteenth aspect of the disclosure, there is provided a computer program, comprising instructions which, when executed on at least one processor, cause the at least one processor to carry out the method according to the first aspect of the disclosure.

In a fourteenth aspect of the disclosure, there is provided a computer program, comprising instructions which, when executed on at least one processor, cause the at least one processor to carry out the method according to the second aspect of the disclosure.

In a fifteenth aspect of the disclosure, there is provided a computer program, comprising instructions which, when executed on at least one processor, cause the at least one processor to carry out the method according to the second aspect of the disclosure.

According to the various aspects and embodiments as mentioned above, efficiency of multi-cast communication can be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
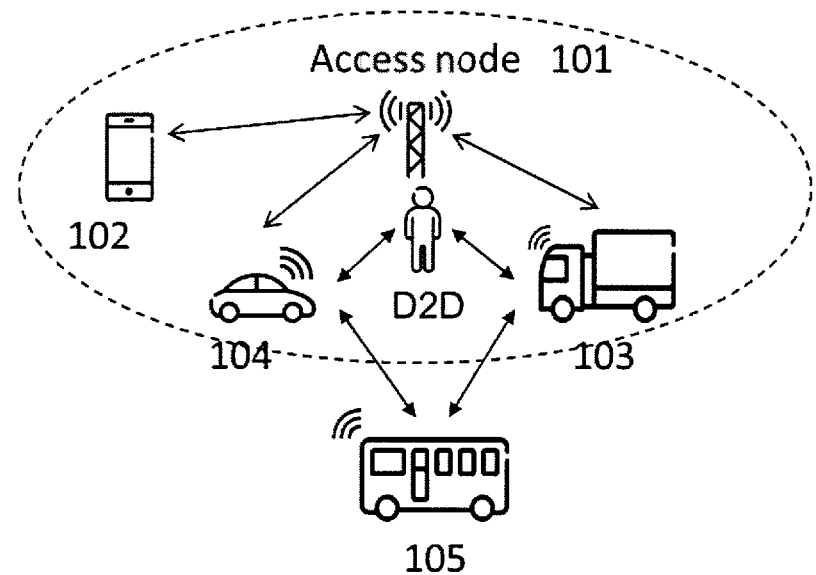
FIG. 1 illustrates a schematic V2X scenario based on a LTE network.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "devices", "terminal device", "user equipment" and "UE" may be used interchangeably. Similarly, the term "access node" may represent a base station (BS), a node B (NodeB or NB), an evolved NodeB (eNodeB or eNB), a Remote Radio Unit (RRU), a radio head (RH), a remote radio head (RRH), a relay node (RN), a low power node (LPN) such as a femto, a pico, an access point (AP) and so forth.

For illustrative purposes, several embodiments of the present disclosure will be described in the context of a 3GPP LTE system. Those skilled in the art will appreciate, however, that the concept and principle of the several embodiments of the present disclosure may be more generally applicable to other wireless networks, for example a third generation (3G) CDMA-based network or a future network (e.g., a 5G or NX system).

The non-limiting and exemplary embodiments of the present disclosure relate to multicast communication. In an LTE system, the multicast communication can be provided via Multimedia Broadcast/Multicast Service (MBMS). The MBMS aims at providing an efficient mode of delivery for both broadcast and multicast services over a core network. MBMS was introduced in the second release of the LTE specifications (i.e., Release 9), although the initial Release 8 physical layer specifications were already designed to support MBMS by including essential components to ensure forward-compatibility.

The LTE MBMS feature is largely based on those already available in UTRAN (from Release 6) and GERAN with both simplifications and enhancements. In the general sense, broadcasting includes distributing content to multiple users, and in the case of mobile multimedia services, it includes an efficient transmission system for the simultaneous delivery of content to a large group of mobile users. Typical broadcasted content may include newscasts, weather forecasts or live mobile television, and now is extended into the LTE E-UTRAN system.

Figure 2:
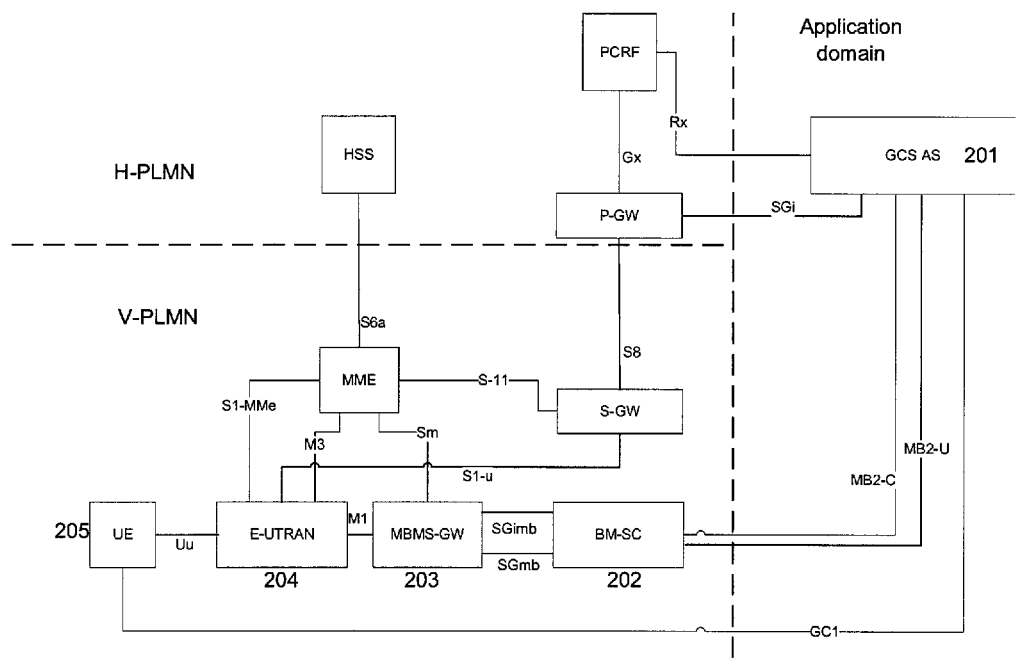
FIG. 2 illustrates an exemplary network structure for group communication.

FIG. 2 illustrates an exemplary network structure for group communication with reference to 3GPP 23.468 V13.3.0. In this example, key network entities include an application server of Group Communication Service (GCS) (denoted as GCS AS 201 in FIG. 2) and a Broadcast-Multicast Service Centre (BM-SC) 202. The traffic goes from the GCS AS 201 towards the BM-SC 202, and then the BM-SC may, for example, forward it to an MBMS GW 203 (MBMS Gateway) for sending to UE via a radio access network such as E-UTRAN 204. Please note that here the service can be provided by either unicast or multi-cast in a flexible way, decided by application server GCS AS 201 (where the unicast bearer is routed back to P-GW of Home Public Land Mobile Network (H-PLMN) in FIG. 2). Group communication is for instance the base of Mission Critical Push-To-Talk (MCPTT) applications where a mission critical group of users (e.g. police, ambulance, rescue teams, etc.) can reach in a large area, a large number of other users belonging to the same group.

From RAN perspective, MBMS transmissions can be realized with two different techniques:

MBSFN, where the same content of an MBMS bearer (which corresponds to a specific service identified with the TMGI indicator) is transmitted from different cells belonging to the same MBMS area which can span a very large area. The transmissions from the different cells are time-synchronized so that the resulting signal will, from a terminal point of view, appear as a transmission from a single cell. Obviously, in order to realize such a combining gain at the UE, all the cells joining the same MBMS session should coordinate their scheduling decisions. In MBSFN, the scheduler is not located in the eNB, but in the Multi-cell/multicast Coordination Entity (MCE) node which can coordinate scheduling allocations for multiple eNBs. MBSFN transmissions occur over a dedicated multicast transport channel (MCH) over which both control signalling (e.g. Multicast Control Channel (MCCH)) and data (e.g. Multicast Traffic Channel (MTCH)) are multiplexed.

SC-PTM, where multicasting of MBMS data is not executed simultaneously from multiple cells as in MBSFN, but it is limited to a single cell area. Multicast transmissions (both control signalling and data) are sent over PDSCH and scheduled by the eNB.

As discussed above, MBMS turns to be useful also in V2X uses cases. However, in V2X communication, unlike typical MBMS use cases, a V2X message does not need to be delivered in a very large area. Specifically, in V2X the target communication range (how far a message should be forwarded from the vehicle which originates it) is around ~300 m [SA1 TR], which is shorter compared to typical cell level coverage (e.g., typical inter site distance (ISD) is 500 m or 1732 m). Additionally, the area in which a certain V2X message is provided might need to vary dynamically, e.g. sudden emergency messages need to be delivered in a confined area in proximity of an accident. Depending on the desired communication range and on the location where the message should be delivered, the broadcasting area might span a single cell or multiple neighboring cells.

Realizing the above, the existing MBMS framework might not be straightforward since MBMS deals with a static multicasting delivery area configuration and typically an MBMS session is not associated to a specific location. The current (enhanced) MBMS ((e)MBMS) service in LTE only support broadcast service in cell level at the smallest granularity, so it would cause a resource waste for which we need a more robust transmission format to reach wider coverage, which is however more than necessary if we can limit it to a smaller geo-area.

A solution to this is further cell splitting, which however has the concern of extra cost on network hardware deployment.

In the present disclosure, methods, apparatuses, and computer program products are provided to enable a more efficient multi-cast communication. Though embodiments of the present disclosure can be implemented in the exemplary network structure shown in FIG. 2, it would be appreciated that embodiments of the disclosure are not limited to such a network structure. With embodiments of the present disclosure, resource consumption for multi-cast service can be reduced, unnecessary transmission can be reduced and power of both transmitters and receivers being involved can be saved.

Figure 3:
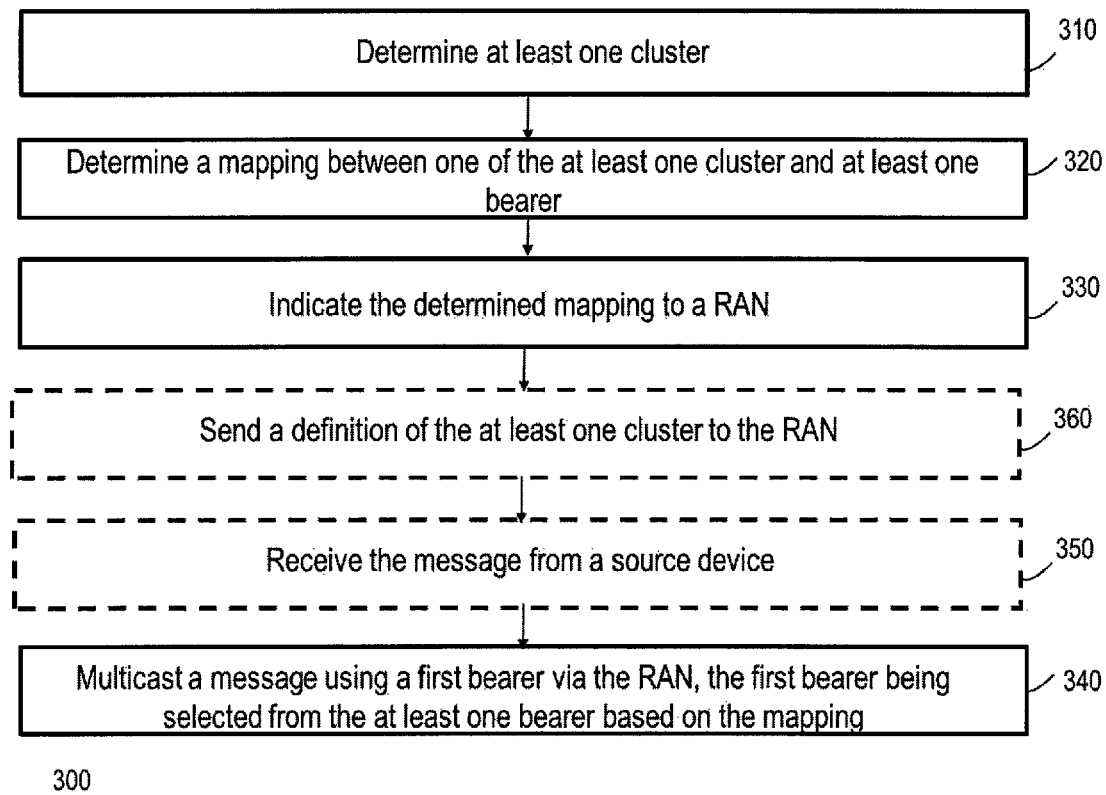
FIG. 3 illustrates a flowchart of a method implemented at a server according to an embodiment of the present disclosure.

Reference is now made to FIG. 3, which shows a flowchart of a method 300 according to an embodiment of the present disclosure. The method 300 is implemented at a server (e.g., an application server like the GCS AS 201 shown in FIG. 2). The Application Server can be a V2X server in the case of V2X applications.

As shown in FIG. 3, the method 300 comprises determining at least one cluster at block 310; determining a mapping between one of the at least one cluster and at least one bearer at block 320, indicating the determined mapping to a radio access network (RAN) at block 330; and multicasting a message using a first bearer via the RAN at block 340. The first bearer is selected from the at least one bearer based on the mapping. Here, "first bearer" is used just to distinguish it from other bearers of the at least one bearer.

With embodiments of the disclosure, a message can be multicast via a specific bearer associated with a target cluster, that is, the transmission of the message targets at a specific cluster rather than a cell or a MBMS service area. Therefore, it enables a more flexible delivery of multicast services. When a cluster is defined with coverage smaller than a cell, less transmission power or resource will be required for the multicast.

The mapping between each of the at least one cluster and bearers can be either a one to one mapping or a one to N (N is a natural number larger than one) mapping, so that UEs in a specific cluster may need to monitor either a single bearer or multiple bearers.

In an embodiment, at block 310, the cluster can be defined/determined by the AS based on at least one of: a geographical area, a cell identification and signal quality, a type of the terminal devices, and a service type. It means, the cluster is used for delivering of a message to a specific geographical area, and/or, to a group of UEs with a specific UE type, and/or, to a group of UEs associated with a specific service type. In some embodiments, the cluster is in essence a group of (receiving) UEs or a group of (receiving) UE positions. In an embodiment, the cluster can be smaller than a cell. In another embodiment, the cluster can be located at a cell center. In some embodiments, the cluster can be located across cell edges of multiple cells.

Currently, the geographical area is divided using cell-level coverage, i.e., the UE location is differentiated via a serving cell ID, e.g., ECGI. With embodiments of the disclosure, defining a coverage smaller than a cell is enabled without physical cell splitting. For instance, coverage of a cluster may be defined using geographical coordinates, e.g., a combination of latitude and longitude can be used to indicate the center of one cluster. With knowledge of a geographical location of the cluster center, the UE can figure out the nearest cluster which it belongs to, for example, by calculating a distance between the UE and the cluster center based on its current geographical location. The geographical location of the UE may be obtained by using Global Navigation Satellite System (GNSS) solution, for example. In this way, the cluster coverage can be defined.

Alternatively, the coverage of a cluster may be defined using a cell ID and a RSRP/RSRQ measurement. That is, a combination of RSRP/RSRQ and an associated specific cell ID can be used to indicate the coverage of one cluster. Based on the RSRP/RSRQ measurement result, a UE can know which cluster the UE belongs to, so that the cluster coverage can be defined.

At UE side, by determining the cluster to which the UE belongs (e.g., based on the mapping and its current location, device type or service type), the UE can limit the MBMS reception to specific bearers for lower processing complexity.

Figure 4:
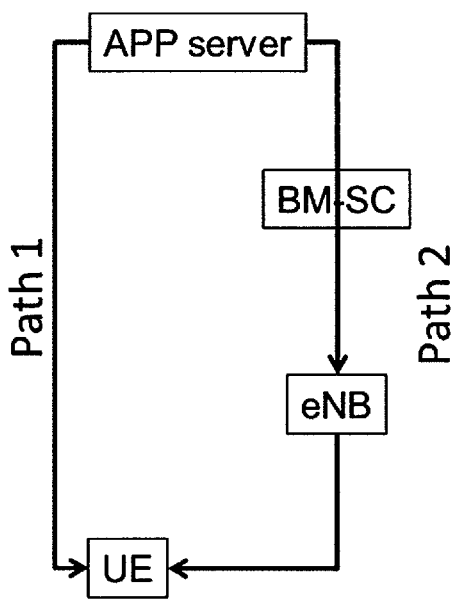
FIG. 4 illustrates a schematic diagram of two paths for delivering information to a RAN, according to an embodiment of the present disclosure.

At block 330, the determined mapping can be indicated to the RAN in a variety of ways, and embodiments of the disclosure are not limited to any specific path for delivering the mapping information. A schematic illustration of some exemplary embodiments for indicating the mapping is shown in FIG. 4. As shown by Path 1 in FIG. 4, in one embodiment of the disclosure, the Application (APP) Server may indicate the determined mapping to at least one of the terminal devices directly via an interface between the at least one terminal device and the App Server. In this case, the mapping may be sent as an application layer signaling or a part of it via the interface between the UE and APP Server directly.

In another exemplary embodiment shown as Path 2 in FIG. 4, the App Server may indicate the determined mapping to an access node (e.g., a base station, or an eNB) of the RAN via a BM-SC, for example the BM-SC 202 shown in FIG. 2. It would be appreciated that there can be other network entities involved for forwarding the mapping from the BM-SC to the access node in some embodiments, depending on the network structure to which embodiments of the disclosure are applied. For instance, at least one of a MBMS GW, a MME and a MCE may be present between the BM-SC and the access node. For example, an APP server may provide BM-SC with ECGI info, plus cluster info, the BM-SC may map the cell IDs into MBMS Service Area Identities subject to operator policies. The BM-SC shall then include a list of MBMS Service Area Identities and, if available, the list of cell IDs, plus the cluster info, in the MBMS Session Start message, down the path to an eNB. After that, the eNB may send this cluster info to UE via RRC signaling like System Information Block (SIB). It would be appreciated that the eNB may not send the full but part of the cluster information to the UE in some embodiments. The cluster info in the above exemplary steps refers to the definition of the cluster, or the cluster to bearer(s) mapping or both.

In one embodiment, the message being multicast at block 340 may be a message received by the AS from a source device at block 350. The source device is a device that generates the message. In another embodiment, multicasting the message using a first bearer via the RAN at block 340 may comprise selecting the first bearer from among the at least one bearer based on the mapping and at least one of: a location of the source device and content of the message, and then multicasting the message to the selected first bearer.

For instance, the APP server may receive the messages from a transmitting UE via UL of the air interface or from another APP server. The message may include a geographical location of the transmitting UE (source UE) of the message, or location of a relevant event (e.g., a traffic accident). Then at block 340, the AS can derive which cluster(s) this message should be sent to, based on the cluster mapping and a target communication range (e.g., X meters around the transmitting UE/the event). Then based on the derived specific cluster and the mapping between cluster and bearers, the AP can select a bearer for carrying the message. In one embodiment, the bearer is per cluster, i.e., there is one bearer for each cluster. In case the cluster is defined based on specific UE type/service type, there is one bearer for each UE type/service type. It enables differentiating of the bearers used for vehicle and pedestrian. As described above, the cluster to bearer mapping is sent to the RAN at block 330.

In order to differentiate different bearers, in one embodiment, different TMGIs can be used for different bearers. In another embodiment, a same TMGI can be shared by more than one cells, and different flow IDs can be utilized for differentiating the bearers of different cells. In such a case, the flow IDs may not be visible to the RAN. In still another embodiment, the same TMGI can be shared by different cells, and different bearers in one cell can be differentiated via different flow IDs visible to the RAN. That is, in some embodiments of the disclosure, bearers can be identified at least by a TMGI, and both the TMGI and a flow ID.

As described above, the cluster can be defined based on at least one of: a geographical area, a cell identification and signal quality (e.g., RSRP or RSRQ), a type of terminal devices, and a service type to be provided to terminal devices. In one embodiment, the AS defines the cluster and informs the definition of at least one cluster to the RAN, e.g., the AS can send the definition of the cluster to the RAN at block 360.

In particular, in one embodiment, at block 360, the AS may send the definition of the cluster to the RAN via various ways, similar as the delivery of the cluster to bearer(s) mapping described above. For example, the definition of the cluster can be sent to a device (e.g., a terminal device in the RAN) via an interface between the device and the AS, as shown by Path 1 in FIG. 4. The definition can be included in an application layer signaling. In another embodiment, the AS may send the definition of the cluster to an access node (e.g., an eNB) of the RAN via a BM-SC, as shown by Path 2 in FIG. 4.

Then in some embodiments, the AS may have two types of information delivered to the RAN. The first type of information is the cluster coverage definition (also referred to as definition of a cluster or clusters). The definition can be based on either geographical location (e.g., Latitude, Longitude), or RSRP/RSRQ level threshold. It would be appreciated that other signal quality metrics (e.g., pathloss) may also be used for defining the cluster(s). The second type of information is the mapping between a cluster and multi-cast bearer(s). The mapping can be a one to one (1:1) mapping or a one to multiple (1:N) mapping, so that the UEs in a specific cluster has to monitor either a single or multiple bear(s). These two types of information may be sent via the same or different paths. For example, the definition of cluster (s) can be sent via Path 1 and the mapping can be sent via Path 2 shown in FIG. 4, or vice versa. Or, both the definition and the mapping may be sent via Path 1 or Path 2 shown in FIG. 4.

As described with reference to FIG. 4, Path 1 is to send directly between the APP server and UE, at application layer, while Path 2 is to send via multiple network entities and multiple interfaces in-between. For each type of information, there are at least two possible paths, then, there are at least 2*2=4 sub-embodiments for sending the information. In one embodiment, the information of the cluster(s) definition can be sent via Path 1, so that the mapping between a specific V2X service and location is sent to UE via application layer messages, and can be fully downloaded at UE power-on (e.g., the full map at a specific city/country), or partly downloaded based on the current UE location (so that the map around the current UE geo-location). This information can be acquired by the UE as part of the USD message transferred by the application layer when the UE registers to the V2X server. The mapping information can be sent via Path 2, so that when the bearer is established, the characteristic is specified, in terms of the associated cluster(s) (which can be 1:1 mapping, or 1:N mapping, so that more than one cluster has to monitor this specific bearer), and the information would be carried by a signaling bearer at the air interface, e.g., RRC signaling, so that it can be known by UE by RRC decoding.

In one embodiment, a limited number of TMGIs can be reused, differentiated by flow IDs as described above or a new field. In another embodiment, the mapping of neighboring clusters/cells can be sent from the serving cell to the UE, so that the UE can know before entering into the new cluster, to avoid service interruption.

In another embodiment, the principle for defining the clusters may be predefined, and then the RAN may obtain the definition of the clusters without explicit signaling from the AS.

Figure 5:
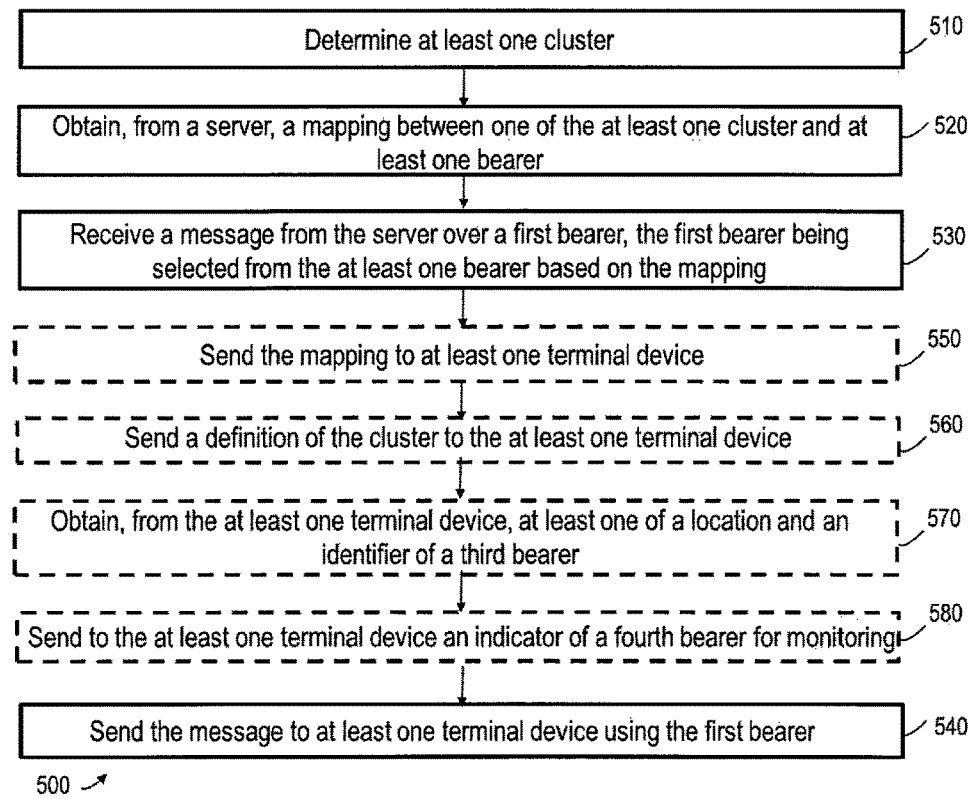
FIG. 5 illustrate flowcharts of a method implemented at a base station according to an embodiment of the present disclosure.

Reference is now made to FIG. 5, which illustrates a method 500 implemented at a based station in a RAN. The base station may be the access node shown in FIG. 1, or an eNB operating in the E-UTRAN 204 shown in FIG. 2. The base station can communicate with a server which performs the method 300.

As illustrated, the method 500 comprises determining at least one cluster at block 510; obtaining, from a server, a mapping between one of the at least one cluster and at least one bearer at block 520; receiving a message from the server over a first bearer at block 530; and sending the message to at least one terminal device using the first bearer at block 540. The first bearer is selected from the at least one bearer based on the mapping.

In one embodiment, at block 510, the base station may determine the cluster based on at least one of: a geographical area; a cell identification and a signal quality; a type of terminal devices, and a service type. Details of the definition of the clusters described with reference to method 300 and FIG. 3 also apply here and thus will not be repeated. For example, the geographical area information used for defining the cluster can be a combination of latitude and longitude used for indicating the center of one cluster, and/or, the signal quality may be, but not limited to RSRP, RSRQ, pathloss, etc.

In another embodiment, at block 510, the base station may receive a definition of the at least one cluster from the AS. Then the cluster can be determined based on the received information. The base station may receive the definition via various paths from the AS. For example, the definition of the at least one cluster received at block 510 can be that sent by the AS in block 360 of method 300 as shown in FIG. 3. Therefore, descriptions on transmission path for the definition of the at least one clusters provided with reference to method 300, FIG. 3 and FIG. 4 also apply here.

Similarly, the mapping may be obtained via various ways at block 520. As one example, the base station may receive the mapping via a BM-SC, e.g., the BM-SC 202 shown in FIG. 2. In an embodiment implemented in a network structure like that shown in FIG. 2, the base station may receive the mapping via more network entities, for example at least one of a MBMS GW, a MME and a MCE. It would be appreciated, depending on the network structure to which embodiments of the present disclosure are applied, the base station may receive the mapping via less or more or different network entities than that shown in FIG. 2 or 4.

In one embodiment, the method 500 may further comprise sending the mapping to at least one terminal device at block 550. For example, the base station may forward the received mapping information to the terminal device. Alternatively, the base station may send part of the received mapping information to the terminal device. For example, the base station may only send a geographical coordinate or a reference position associated with a specific bearer to the device, for the device to derive whether it belongs to a cluster mapped to the bearer.

In another embodiment, the base station can also send the definition of the cluster to the at least one terminal device at block 560.

It would be appreciated that embodiments of the disclosure are not limited to any specific way for sending the mapping information and/or the definition of clusters to the terminal device. Depending on the network where embodiments of the disclosure are applied, different channels or signaling can be used for this purpose.

With the information (e.g. the mapping information, cluster definition information, geographical coordinates or a reference position associated with a specific bearer) from the base station or part of it, the UE may learn the location in which a certain TMGI is of interest. Therefore, the UE could report its interest in that TMGI to the base station when it is within a certain range from that location, for example, as part of counting response and MBMS interest indication.

Therefore, in some embodiments, the eNB may assist the UE in determining the areas in which a certain service (identified via, e.g., TMGI) could be of interest. For instance, the V2X server may only provide the UE with a set of TMGIs that match the UE profile/subscription as part of the USD. When to actually start monitoring a TMGI is known by a terminal device directly from the base station indicating the location in which a certain TMGI is of interest. The location information can be the geographical coordinates or can contain a reference position that the UE can use to determine whether it is approaching an area of interest and this information can be sent to a terminal device at block 550 as described above. When the UE is within a certain range from the reference position of a TMGI it will start monitoring the corresponding multicast data channel. The reference position can be derived by the eNB from the geographical coordinates that the V2X server indicated for a specific TMGI.

The assistance from the base station as described above can be useful, since it is possible that the UE might not be able to download at registration the whole map of an area covered by a V2X server. Additionally, the V2X sessions might be quite dynamic, e.g. the V2X AS may suddenly need to initiate a new V2X session in an area close to an accident. Notifying that to the UEs could be difficult since they could be in IDLE mode. In such cases, the embodiment above, where the base station assists a terminal device in determining the areas in which a certain service could be of interest, may be advantageous.

Optionally, in one embodiment, the method may comprise block 570 where the base station obtains from at least one terminal device, a location of the at least one terminal device and/or an identifier of a third bearer; and a block 580 where the base station sends an indicator of a fourth bearer for monitoring to the at least one terminal device. In one embodiment, the third bearer can be a bearer of interest for the at least one terminal device, i.e., a bearer which the at least one terminal wishes to monitor. In another embodiment, the location of the at least one terminal device can be a geographical position represented by a combination of latitude and longitude, or a position with respect to a reference position. The reference position can be informed by the base station or predefined. The location of the at least one terminal device and/or the identifier of a third bearer may be reported by the at least one terminal device periodically or based on a trigger from the network.

By receiving the location of the at least one terminal device, and/or the identifier of the third bearer, the base station is aware of a specific cluster/bearer associated with the at least one terminal device, and can figure out the number of UEs that are located in its coverage area and ensure proper admission control and scheduling operations of multicast data when the at least one terminal device is approaching an area of interest.

Figure 6A:
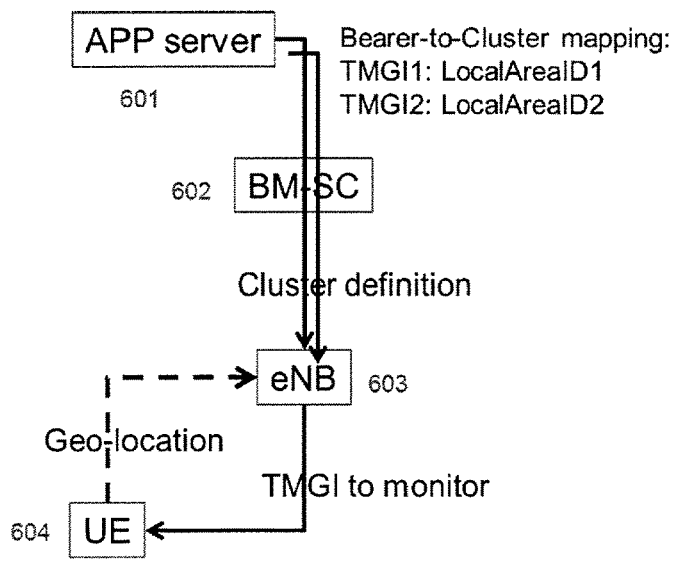
FIG. 6a illustrates a schematic diagram of signaling flow which can be used in the above embodiment.
Figure 6B:
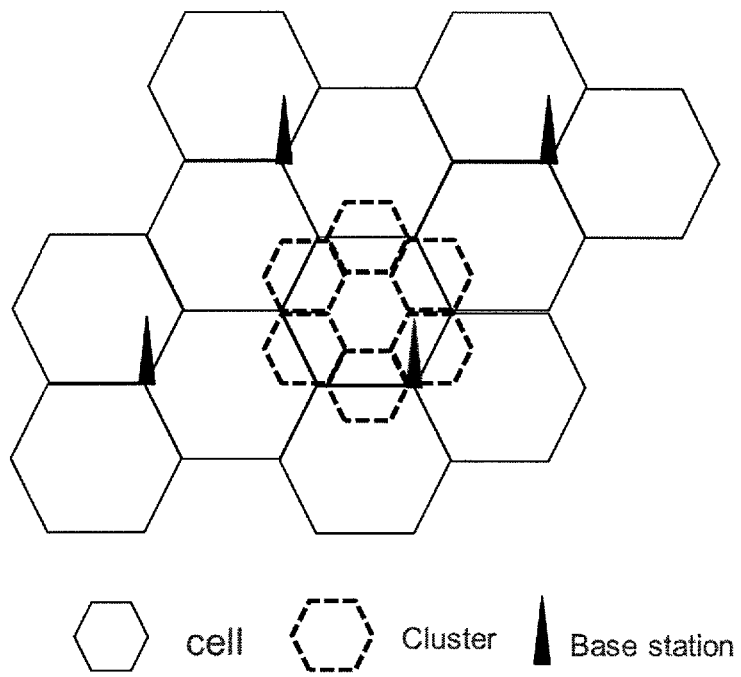
FIG. 6b shows a schematic diagram of a group of clusters within cellular coverage.

FIG. 6a illustrates a schematic diagram of a signaling flow which can be used in the above embodiment. As shown in FIG. 6a, the application server (shown as APP server 601 in the FIG. 6a) may send a mapping between a cluster and a bearer to the eNB 603 via a BM-SC 602, and then the eNB can receive a report from the UE 604 regarding geographical location information of the UE, and then the eNB may indicate the bearer to be monitored to the UE. In this example, a cluster is defined by a local area (e.g., LocalAreaD1, LocalAreaD2) and a bearer is represented by a TMGI (e.g., TMGI1, TMGI2). A cluster of LocalAreaD1 is mapped to a bearer of TMGI1, and a cluster of LocalAreaD2 is mapped to a bearer of TMGI2. It would be appreciated that in other embodiments, a cluster may be defined by other factors, e.g., a service type or UE type, etc., and the cluster may be mapped to more than one bearer. In addition, in some embodiments, the eNB may indicate the bearer to be monitored to the UE without sending the full mapping to the UE. In other embodiments, the eNB may send both the bearer to be monitored and the full mapping to the UE. FIG. 6b shows a schematic diagram of a group of clusters within the cellular coverage. It can be seen that a cluster can be smaller than a cell. The cluster may locate at a cell center. In some embodiments, the cluster can locate across cell edges of multiple cells.

In one embodiment, at block 540, the base station may determine the at least one terminal device based on the mapping and at least one of: a type of the terminal devices, a service type and a location of the at least one terminal device. For example, the type of the terminal devices, and/or, a service type, and/or, a location of a terminal device can be used to determine whether the terminal device belongs to a specific cluster, and whether the terminal is a target receiver of the message sent via a specific bearer associated with the specific cluster.

As described above, the at least one bearer can be identified at least based on one of: a TMGI, and both the TMGI and a flow ID.

Figure 7A:
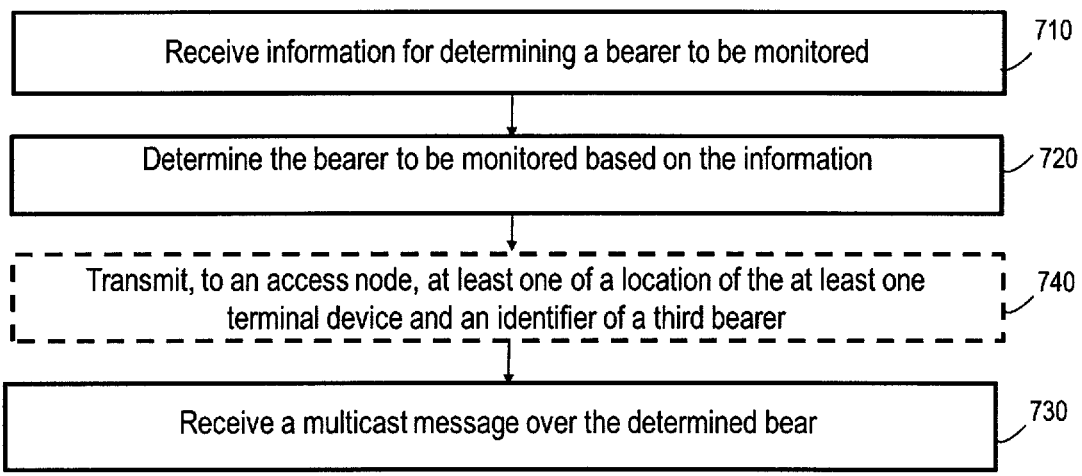
FIGS. 7a-7b illustrate a method implemented at a terminal device according to an embodiment of the present disclosure.

Reference is now made to FIG. 7, which illustrates a method 700 implemented at a terminal device in a RAN. The terminal device can be of any type that is capable of wireless communication, e.g., it can be a wireless device mounted in a vehicle shown in FIG. 1. In one embodiment, the terminal device may operate in a network structure as shown in FIG. 2, and communicate with an eNB in the E-UTRAN 204 shown in FIG. 2. The eNB may communicate with the terminal device using a least part of the steps described with reference to method 500.

As illustrated, the method 700 comprises: receiving information for determining a bearer to be monitored at block 710; determining the bearer to be monitored based on the information at block 720; and receiving a multicast message over the determined bear at block 730.

At block 710, the information for determining a bearer to be monitored can be received in various ways. In one embodiment, the information for determining a bearer to be monitored includes a mapping between one of at least one cluster and at least one bearer. In another embodiment, the information for determining a bearer to be monitored includes a definition of the at least one cluster. In still another embodiment, the information includes both the mapping and the definition of the at least one cluster.

The information received by the UE at block 710 may be that sent by a base station (e.g., an eNB in the E-UTRAN 204 shown in FIG. 2) at block 550 and/or block 560 using method 500. Therefore, descriptions provided with respect to the information with reference to FIG. 5 and method 500 also apply here.

The information for determining a bearer to be monitored can be received via various ways, or via various paths. In one embodiment, at block 710, the UE may receive the information directly from a server via an interface between the terminal device and the server which could be an application server, e.g., the GCS AS 201 shown in FIG. 2, or a V2X AS in the case of V2X application. The information may be received in an application layer signaling in such case and this path can be denoted as Path 1. In another embodiment, the information can be received at block 710 from an access node of a RAN. This can be denoted as Path 2. The access node could be an eNB when the embodiment is applied in a LTE network. It would be appreciated that the access node can be of any suitable type depending on the network to which embodiments of the disclosure are applied.

Different types of the information may be carried via different paths. For example, the definition of the cluster may be received via Path 1, while the mapping information may be received via Path 2, or vice versa. It would be appreciated that in some embodiments, these two types of information can be received at block 710 via the same path (Path 1 or Path 2, or any other suitable path).

Alternatively or additionally, in one embodiment, at block 710, the UE may receive the information for determining a bearer by receiving an indicator of a bearer to be monitored or an indication of a geographical coordinate or a reference position associated with the bearer to the monitored, from an access node. The indicator of a bearer to be monitored and the indication of a geographical coordinate or a reference position associated with the bearer to the monitored can be that sent by a base station at block 550 or 580 according to method 500. Therefore relevant descriptions provided with reference to method 500 also apply here.

Figure 7B:
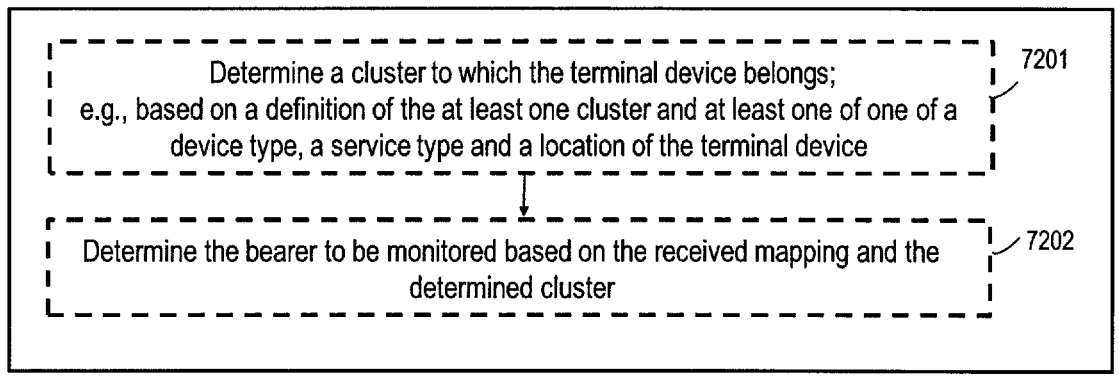

In one embodiment as shown in FIG. 7b, at block 720, the UE may determine the bearer to be monitored by determining a cluster to which the terminal device belongs at block 7201; and determining the bearer to be monitored based on the received mapping and the determined cluster at block 7202. In another embodiment, at block 7201, the UE may determine the cluster based on a definition of the at least one cluster and at least one of one of a device type, a service type and a location of the terminal device.

For example, UE can figure out the cluster it is currently located at, and/or, its UE type, and/or, the service type it is interested in at block 710, and then at block 720, based on the cluster-bearer mapping (including a location to bearer mapping and/or a UE type and/or service type to bear mapping) sent from an AS or an access node, the UE is aware of which bearer(s) to be monitored, in order to receive relevant messages, happened within target communication range (X meter) around its current geo-location. In some embodiments, the UE type and/or service type can be used in combination with a location to define a cluster, thereby providing finer granularity of a cluster definition.

In one embodiment, a bearer can be identified at least by one of: a TMGI, and the TMGI and a flow identifier (ID). In the case that a flow ID is also used for identification, some of the TMGIs may be reused by different cells, thereby reducing the required number of TMGIs.

In another embodiment, the method 700 may further comprise block 740, where the UE transmits, to an access node, at least one of: a location of the UE and an identifier of a third bearer. The information transmitted by the UE at block 740 can be that received by a base station at block 570 according to method 500, and therefore relevant descriptions provided with respect to method 500 also apply here. For example, the third bearer indicated at block 740 can be a bearer of interest for the at least one terminal device, i.e., a bearer which the at least one terminal wishes to monitor. In another embodiment, the location of the at least one terminal device can be a geographical position represented by a combination of latitude and longitude, or a position with respect to a reference position. The reference position can be informed by the base station or predefined. The location of the at least one terminal device and/or the identifier of a third bearer may be reported by the at least one terminal device periodically or based on a trigger from the network. By receiving the location of the at least one terminal device, and/or the identifier of the third bearer, the base station is aware of a specific cluster/bearer associated with the at least one terminal device, and can figure out the number of UEs that are located in its coverage area and ensure proper admission control and scheduling operations of multicast data when the at least one terminal device is approaching an area of interest.

Figure 8:
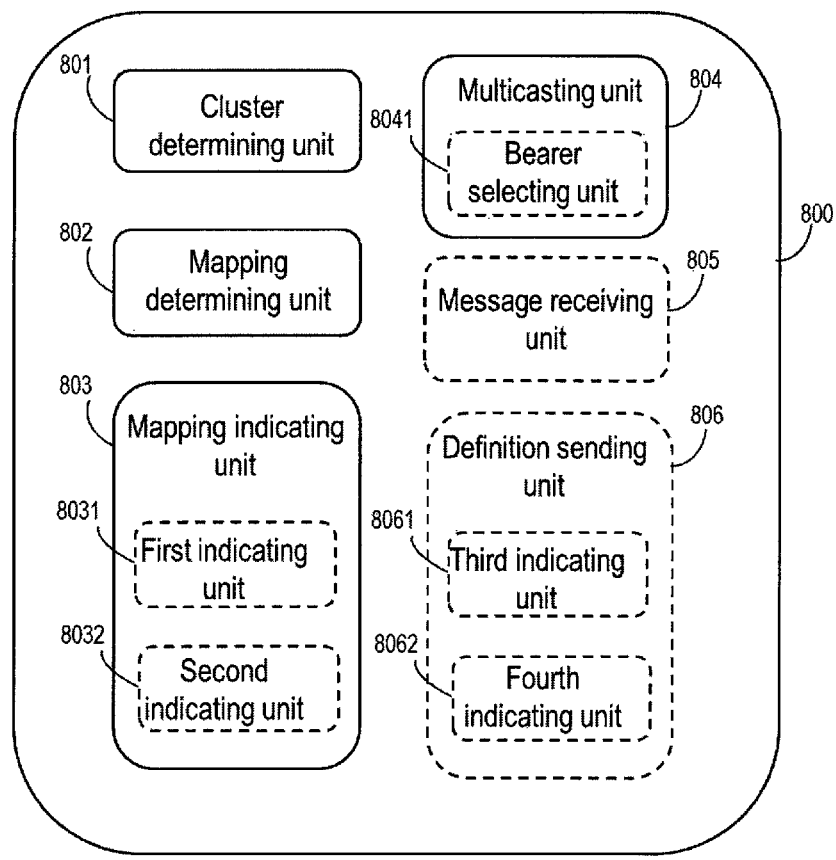
FIG. 8 illustrates a simplified block diagram of an apparatus in a server according to an embodiment of the present disclosure.

Reference is now made to FIG. 8, which illustrates a schematic block diagram of an apparatus 800 in a server according to an embodiment of the present disclosure. The server may be, for example, the GCS AS 201 shown in FIG. 2, or a V2X server. The apparatus 800 is operable to carry out the exemplary method 300 described with reference to FIGS. 3-4 and possibly any other processes or methods. It is also to be understood that the method 300 is not necessarily carried out completely by the apparatus 800. Some steps of the method 300 can be performed by one or more other entities.

As illustrated in FIG. 8, the apparatus 800 comprises a cluster determining unit 801, configured to determine at least one cluster; a mapping determining unit 802, configured to determine a mapping between one of the at least one cluster and at least one bearer; a mapping indicating unit 803, configured to indicate the determined mapping to a radio access network (RAN); and a multicasting unit 804, configured to multicasting a message using a first bearer via the RAN, wherein the first bearer is selected from the at least one bearer based on the mapping.

In one embodiment, the cluster determining unit 801 may be configured to define/determine the at least one cluster based on at least one of the following: a geographical area, a cell identification and a signal quality, a device type, and a service type.

In another embodiment, the mapping indicating unit 803 may comprise: a first indicating unit 8031 configured to indicate the determined mapping to at least one terminal device in the RAN via an interface between the at least one terminal device and the server; or a second indicating unit 8032 configured to indicate the determined mapping to an access node of the RAN via a BM-SC.

In still another embodiment, the apparatus 800 may further comprise a message receiving unit 805, configured to receive the message from a source device which could be a vehicle-mounted wireless device or an AS, or any other suitable device which generates the message. The message may include description of an event occurring around the source device, e.g., a traffic accident. However, embodiments of the disclosure are not limited to any specific message content.

In one embodiment, the multicasting unit 804 may comprise a bearer selecting unit 8041, configured to select the first bearer from among the at least one bearer based on the mapping and at least one of a location of the source device and content of the message. For instance, the message receiving unit 805 may receive the messages from a transmitting UE via UL of the air interface or from another APP server. The message may include a geographical location of the transmitting UE (source UE) of the message, or location of a relevant event (e.g., a traffic accident). Then the bearer selecting unit 8041 can derive which cluster(s) this message should be sent to, based on the cluster mapping and a target communication range (e.g., X meters around the transmitting UE/the event), then based on the derived specific cluster and the mapping between cluster and bearers, the AP can select a bearer for carrying the message. In one embodiment, the bearer is per cluster, i.e., there is one bearer for each cluster. In case the cluster is defined based on specific UE type/service type, there is one bearer for each UE type/service type. It enables differentiating of the bearers used for vehicle and pedestrian.

In one embodiment, a bearer can be identified at least by one of: a TMGI, and the TMGI and a flow ID.

In another embodiment, the apparatus 800 may further comprise a definition sending unit 806, configured to indicate a definition of the at least one cluster to the RAN. In a further embodiment, the definition sending unit 806 may comprise a third indicating unit 8061 configured to indicate the definition of the at least one cluster to at least one terminal device in the RAN via an interface between the at least one target and the server; or a fourth indicating unit 8062, configured to indicate the definition of the cluster to an access node of the RAN via a BM-SC.

In some embodiments, the units of the apparatus 800 may be configured to implement the operations of corresponding blocks of the method 300, and therefore relevant descriptions provided with reference to method 300 also apply here and thus details will not be repeated.

Figure 9:
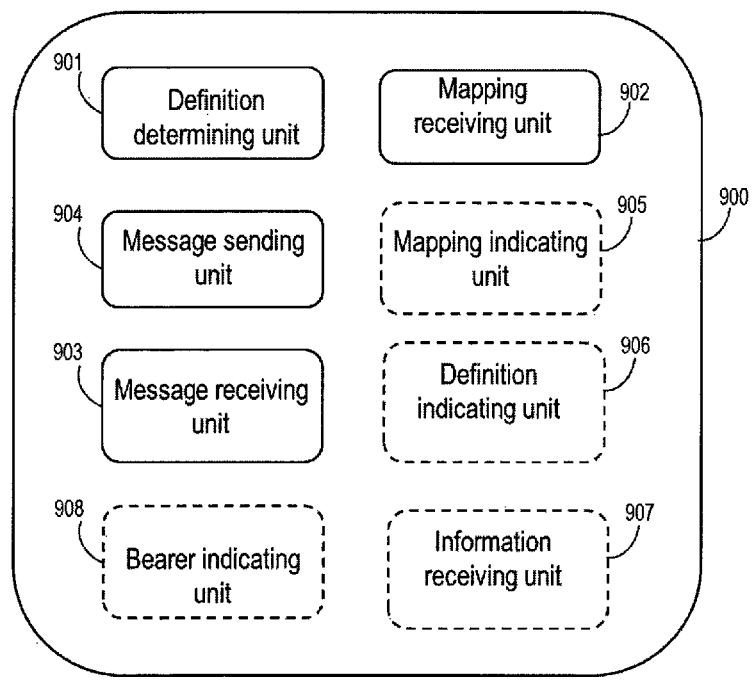
FIG. 9 illustrates a simplified block diagram of an apparatus in a base station according to an embodiment of the present disclosure.

Reference is now made to FIG. 9, which illustrates a schematic block diagram of an apparatus 900 in an access node in a RAN. The access node may be, for example, a base station shown in FIG. 1, or an eNB operating in the E-UTRAN shown in FIG. 2. The apparatus 900 is operable to carry out the exemplary method 500 described with reference to FIG. 5 and possibly any other processes or methods. It is also to be understood that the method 500 is not necessarily carried out completely by the apparatus 900. Some steps of the method 500 can be performed by one or more other entities.

As illustrated in FIG. 9, the apparatus 900 comprises a definition determining unit 901, configured to determine at least one cluster; a mapping receiving unit 902, configured to obtain, from a server, a mapping between one of the at least one cluster and at least one bearer; a message receiving unit 903, configured to receive a message from the server over a first bearer, the first bearer being selected from the at least one bearer based on the mapping; and a message sending unit 904, configured to send the message to at least one terminal device using the first bearer.

In one embodiment, the definition determining unit 901 can be configured to determine the definition of the at least one cluster based on at least one of the following: a geographical area, a cell identification and a signal quality, a device type, and a service type.

In another embodiment, the mapping receiving unit 902 may be configured to obtain the mapping via a BM-SC.

In another embodiment, the apparatus 900 may further comprise a mapping indicating unit 905, configured to indicate the mapping to the at least one terminal device. In still another embodiment, the mapping indicating unit 905 may be configured to indicate to the at least one terminal device a geographical coordinate or a reference position associated with a second bearer.

Alternatively or additionally, in one embodiment, the definition determining unit 901 may be configured to receive the definition of the at least one cluster from the server. In the case the principle for defining the clusters can be predefined, and then the access node can derive the definition of the clusters itself, receiving operation can be omitted.

In one embodiment, the apparatus 900 may comprise a definition indicating unit 906, configured to indicate the definition of the at least one cluster to the at least one terminal device.

Optionally, in one embodiment, the apparatus 900 may comprise an information receiving unit 907, configured to obtain, from the at least one terminal device, at least one of a location of the at least one terminal device and an identifier of a third bearer. In another embodiment, the apparatus may further comprise a bearer indicating unit 908, configured to send to the at least one terminal device an indicator of a fourth bearer for monitoring. In one embodiment, the fourth bearer may be determined by the access node at least partly based on the information received by the information receiving unit 907.

In one embodiment, a bearer can be identified at least based on one of: a TMGI, and the TMGI and a flow ID.

In another embodiment, the message sending unit 904 may be configured to determine the at least one terminal device based on the mapping and at least one of a device type, a service type and a location of at least one terminal device. Then the message sending unit can send the message to the determined at least one terminal device. Therefore, with embodiments of the disclosure, the message can be delivered to well-selected UEs thereby avoiding unnecessary multicasting. The UEs can be determined with the granularity of a cluster, which could be smaller than a cell.

Figure 10:
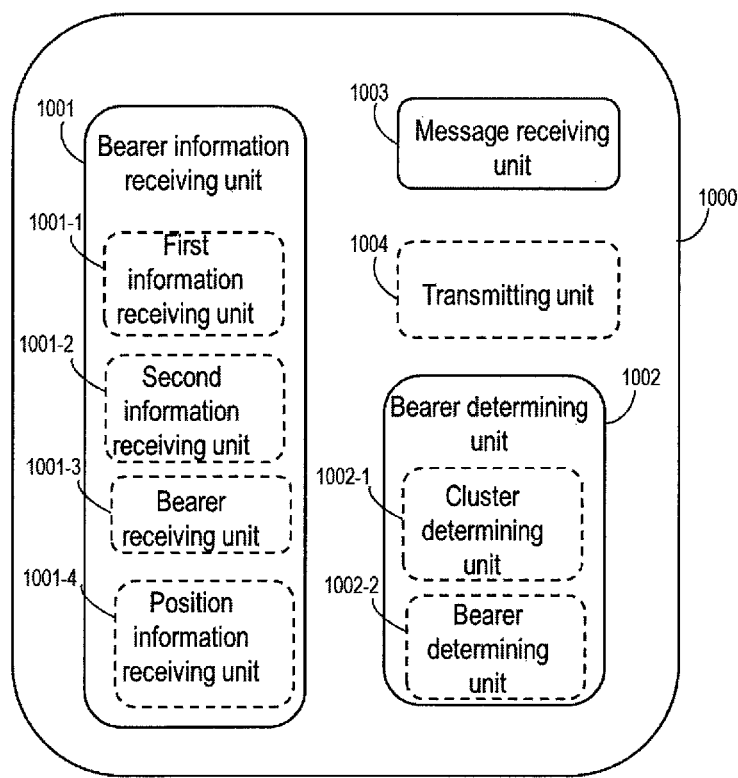
FIG. 10 illustrates a simplified block diagram of an apparatus in a terminal device according to an embodiment of the present disclosure.

Reference is now made to FIG. 10, which illustrates a schematic block diagram of an apparatus 1000 in terminal device in a RAN. The terminal device may be any type of device capable of wireless communication, and it may also be referred to as UE or terminal or device. For example, the terminal device may be a wireless device mounted in a vehicle shown in FIG. 1, and/or the terminal device may operate in the E-UTRAN shown in FIG. 2. The apparatus 1000 is operable to carry out the exemplary method 700 described with reference to FIG. 7 and possibly any other processes or methods. It is also to be understood that the method 500 is not necessarily carried out completely by the apparatus 1000. Some steps of the method 700 can be performed by one or more other entities.

As illustrated in FIG. 10, the apparatus 1000 comprises a bearer information receiving unit 1001, configured to receive information for determining a bearer to be monitored; a bearer determining unit 1002, configured to determine the bearer to be monitored based on the information; and a message receiving unit 1003, configured to receive a multicast message over the determined bear.

In one embodiment, the information for determining a bearer to be monitored received by the bearer information receiving unit 1001 may include at least one of: a mapping between one of at least one cluster and at least one bearer; and a definition of the at least one cluster In one embodiment, the bearer information receiving unit 1001 may comprise a first information receiving unit 1001-1, configured to receive information for determining a bearer to be monitored via an interface between the terminal device and a server; or a second information receiving unit 1001-2, configured to receive the information for determining a bearer to be monitored from an access node of a RAN. It means, with different embodiments, the bearer information receiving unit 1001 may receive the information for determining a bearer to be monitored via different paths. It would be appreciated that embodiments of the disclosure are not limited to any specific path for the bearer information receiving unit 1001 to receive the information.

In another embodiment, the bearer determining unit 1002 may comprise a cluster determining unit 1002-1, configured to determine a cluster to which the terminal device belongs, and a bearer determining unit 1002-2, configured to determine the bearer to be monitored based on the received mapping and the determined cluster. In another embodiment, the cluster determining unit 1002-1 may be configured to determine the cluster based on a definition of the at least one cluster and at least one of one of a device type, a service type and a location of the terminal device.

Alternatively or additionally, in one embodiment, the bearer information receiving unit 1001 may comprise a bearer receiving unit 1001-3, configured to receive an indicator of a bearer to be monitored from the access node; or a position information receiving unit 1001-4, configured to receive from the access node an indication of a geographical coordinate or a reference position associated with the bearer to the monitored.

In one embodiment, a bearer can be identified at least by one of: a TMGI, and the TMGI and a flow ID.

In another embodiment, the apparatus 1000 may further comprise a transmitting unit 1004, configured to transmit to an access node, at least one of a location of the at least one terminal device and an identifier of a third bearer. This enables the access node to provide finer bearer information to the terminal device.

It would be appreciated that, some units or modules in the apparatus 800, 900 or 1000 can be combined in some implementations. For example, in one embodiment, it is possible to use a single transmitting unit to send all the information transmitted by the units 8031, 8032, 8061 and 8062 described with reference to FIG. 8.

Figure 11A:
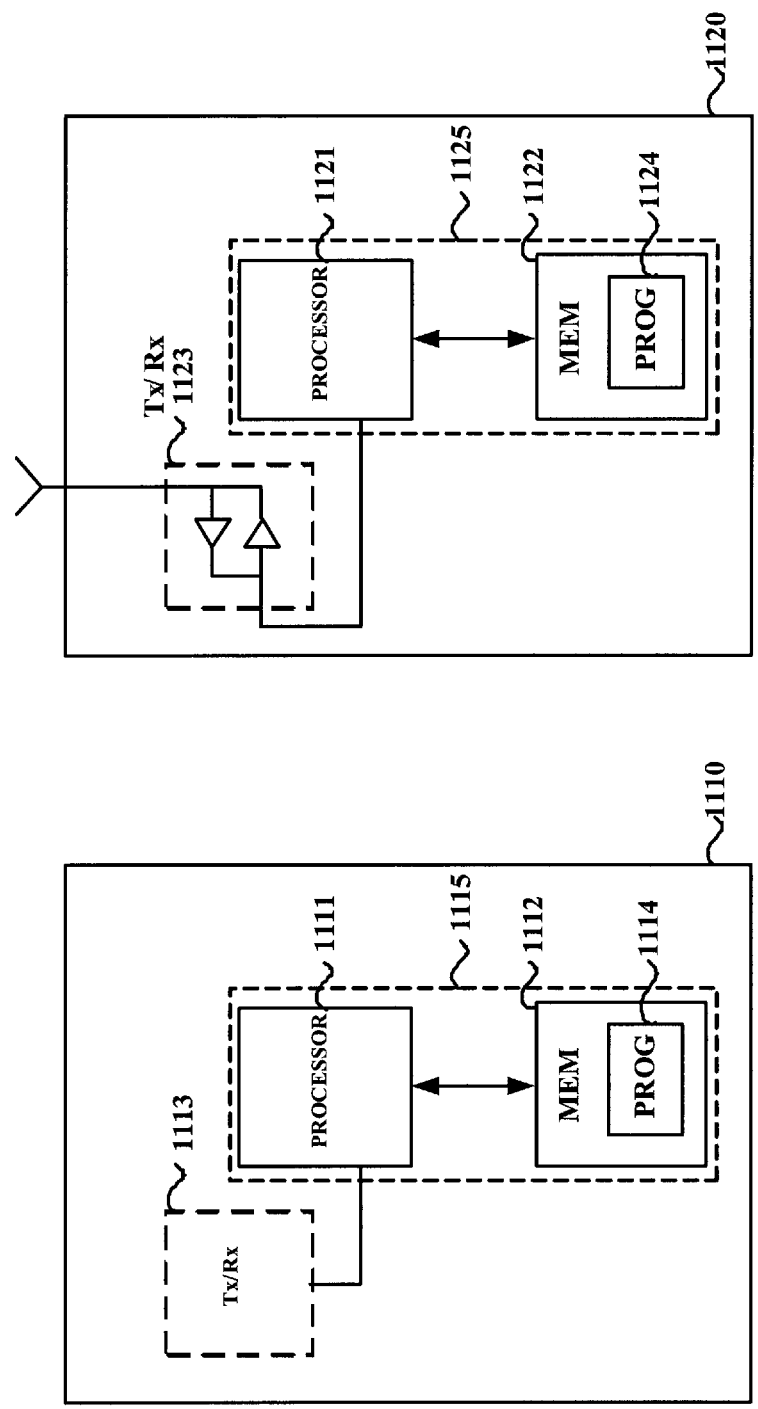
FIGS. 11a-11b illustrate simplified block diagrams of apparatuses in a server, a base station and a terminal device, respectively, according to embodiments of the present disclosure.
Figure 11B:
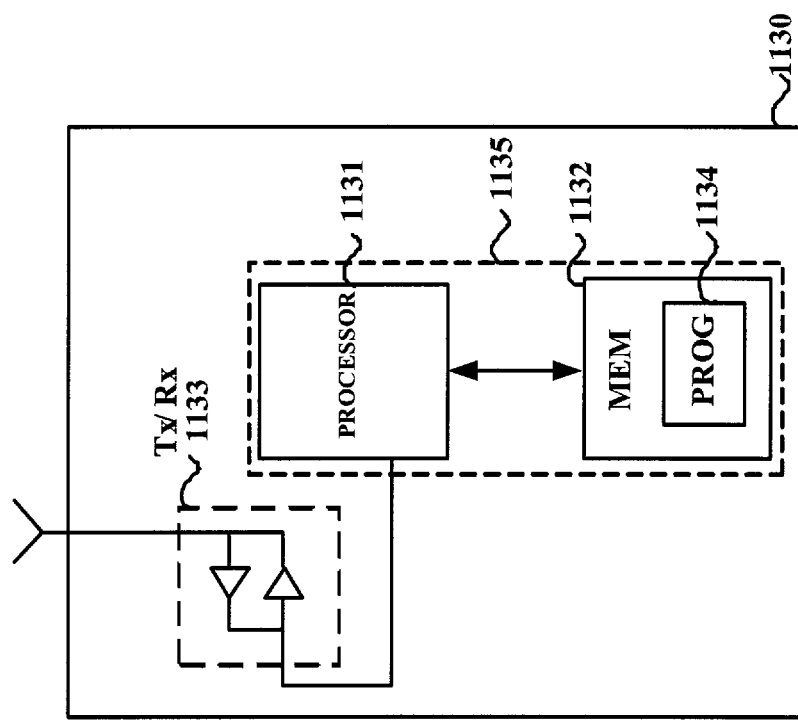

FIG. 11*a* illustrates a simplified block diagram of an apparatus 1110 that may be embodied in/as a server, e.g., the GCS AS 201 shown in FIG. 2, and an apparatus 1120 that may be embodied in/as an access node, e.g., an eNB operating in the E-UTRAN shown in FIG. 2. FIG. 11*b* shows an apparatus 1130 that may be embodied in/as a terminal device, e.g., terminal device 102-105 shown in FIG. 1.

The apparatus 1110 may comprise at least one processor 1111, such as a data processor (DP) and at least one memory (MEM) 1112 coupled to the processor 1111. The apparatus 1110 may further comprise a transmitter TX and receiver RX 1113 coupled to the processor 1111. The MEM 1112 stores a program (PROG) 1114. The PROG 1114 may include instructions that, when executed on the associated processor 1111, enable the apparatus 1110 to operate in accordance with the embodiments of the present disclosure, for example to perform the method 300. A combination of the at least one processor 1111 and the at least one MEM 1112 may form processing means 1115 adapted to implement various embodiments of the present disclosure.

The apparatus 1120 comprises at least one processor 1121, such as a DP, and at least one MEM 1122 coupled to the processor 1121. The apparatus 1120 may further comprise a suitable TX/RX 1123 coupled to the processor 1121. The MEM 1122 stores a PROG 1124. The PROG 1124 may include instructions that, when executed on the associated processor 1121, enable the apparatus 1120 to operate in accordance with the embodiments of the present disclosure, for example to perform the method 500. A combination of the at least one processor 1121 and the at least one MEM 1122 may form processing means 1125 adapted to implement various embodiments of the present disclosure.

The apparatus 1130 comprises at least one processor 1131, such as a DP, and at least one MEM 1132 coupled to the processor 1131. The apparatus 1130 may further comprise a suitable TX/RX 1133 coupled to the processor 1131. The MEM 1132 stores a PROG 1134. The PROG 1134 may include instructions that, when executed on the associated processor 1121, enable the apparatus 1130 to operate in accordance with the embodiments of the present disclosure, for example to perform the method 700. A combination of the at least one processor 1131 and the at least one MEM 1132 may form processing means 1135 adapted to implement various embodiments of the present disclosure.

Various embodiments of the present disclosure may be implemented by computer program executable by one or more of the processors 1111, 1121 and 1131, software, firmware, hardware or in a combination thereof.

The MEMs 1112, 1122 and 1132 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1111, 1121 and 1131 may be of any type suitable to the local technical environment, and may include one or more of general purpose computers, special purpose computers, microprocessors, digital signal processors DSPs and processors based on multicore processor architecture, as non-limiting examples.

Although some embodiments are described in the context of an exemplary network shown in FIG. 2, it should not be construed as limiting the spirit and scope of the present disclosure. The principle and concept of the present disclosure may be more generally applicable to other network architectures.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a server, comprising:
   determining at least one cluster, wherein a cluster of the at least one cluster is defined with coverage smaller than a cell, located across cell edges of multiple cells and identified by a same identifier across the multiple cells, for delivering of a message received by the server from a source device, and wherein the cluster is further determined based on at least one of the following:
   a cell identification and a signal quality,
   a device type, and
   a service type;
   determining a mapping between the cluster and at least one bearer;
   indicating the determined mapping to a radio access network (RAN);
   sending a definition of the cluster to the RAN; and
   multicasting to devices within the cluster the message using a first bearer via the RAN, the first bearer being selected from the at least one bearer based on the mapping.

2. The method according to claim 1, wherein the indicating the determined mapping to the RAN comprises:
   sending the determined mapping to at least one terminal device in the RAN via an interface between the at least one terminal device and the server; or
   sending the determined mapping to an access node of the RAN via a Broadcast Multicast-Service Centre (BM-SC).

3. The method according to claim 2,
   wherein the multicasting the message further comprises selecting the first bearer from among the at least one bearer based on the mapping and at least one of a location of the source device and content of the message.

4. The method according to claim 1, wherein the at least one bearer is identified at least by one of:
   a Temporary Mobile Group Identity (TMGI) used as the identifier, and
   the TMGI and a flow identifier (ID).

5. The method according to claim 1, wherein the sending the definition of the cluster to the RAN comprises:
   sending the definition of the cluster to at least one terminal device in the RAN via an interface between the at least one terminal device and the server; or
   sending the definition of the cluster to an access node of the RAN via a Broadcast Multicast-Service Centre (BM-SC).

6. A method implemented at a base station in a radio access network (RAN), comprising:
   determining at least one cluster, wherein a cluster of the at least one cluster is defined with coverage smaller than a cell, located across cell edges of multiple cells and identified by a same identifier across the multiple cells, for delivering of a message received by a server from a source device, and wherein the cluster is further determined based on at least one of the following:
      a cell identification and a signal quality,
      a device type, and
      a service type;
   obtaining, from the server, a mapping between the cluster and at least one bearer;
   obtaining, from the server, a definition of the cluster;
   receiving the message from the server over a first bearer, the first bearer being selected from the at least one bearer based on the mapping; and
   sending the message to at least one terminal device within the cluster using the first bearer.

7. The method according to claim 6, wherein the obtaining the mapping comprising:
   receiving the mapping via a Broadcast Multicast-Service Centre (BM-SC).

8. The method according to claim 6, further comprising:
   sending the mapping to the at least one terminal device.

9. The method according to claim 8, wherein the sending the mapping to the at least one terminal device comprising:
   sending to the at least one terminal device geographical coordinates or a reference position associated with a second bearer.

10. The method according to claim 6, further comprising:
    sending the definition of the cluster to the at least one terminal device.

11. The method according to claim 9, further comprising:
    obtaining, from the at least one terminal device, at least one of a location of the at least one terminal device and an identifier of a third bearer; and
    sending to the at least one terminal device an indicator of a fourth bearer for monitoring.

12. A method implemented at a terminal device, comprising:
    receiving information for determining a bearer to be monitored for receiving a multicast message received by a server from a source device, wherein the multicast message is multicast to a configured cluster that is defined with coverage smaller than a cell, located across cell edges of multiple cells and identified by a same identifier across the multiple cells, for delivering of the multicast message, wherein the information includes a definition of the cluster sent by the server to a radio access network (RAN), and wherein the configured cluster is further determined based on at least one of the following:
       a cell identification and a signal quality,
       a device type, and
       a service type;
    determining the bearer to be monitored based on the information; and
    receiving the multicast message sent to the cluster over the determined bearer.

13. The method according to claim 12, wherein the information for determining the bearer to be monitored includes
    a mapping between the cluster and at least one bearer.

14. The method according to claim 12, wherein the receiving the information for determining the bearer to be monitored comprising:
    receiving the information via an interface between the terminal device and the server; or
    receiving the information from an access node of the RAN.

15. The method according to claim 13, wherein the determining the bearer to be monitored based on the information comprises:
    determining the cluster to which the terminal device belongs; and
    determining the bearer to be monitored based on the received mapping and the determined cluster.

16. The method according to claim 12, wherein the receiving the information for determining the bearer to be monitored further comprises:
    receiving an indicator of the bearer to be monitored from an access node of the RAN; or
    receiving from the access node an indication of geographical coordinates or a reference position associated with the bearer to be monitored.

17. The method according to claim 12, further comprising:
    transmitting, to an access node of the RAN, at least one of a location of at least one terminal device and an identifier of another bearer.

18. An apparatus in a server, comprising:
    a processor; and
    a memory, said memory containing instructions executable by said processor to cause said apparatus to perform operations to:
    determine at least one cluster, wherein a cluster of the at least one cluster is defined with coverage smaller than a cell, located across cell edges of multiple cells and identified by a same identifier across the multiple cells, for delivering of a message received by the server from a source device, and wherein the cluster is further determined based on at least one of the following:
       a cell identification and a signal quality,
       a device type, and
       a service type;
    determine a mapping between the cluster and at least one bearer;
    indicate the mapping to a radio access network (RAN);
    send a definition of the cluster to the RAN; and
    multicast the message to devices within the cluster using a first bearer via the RAN, the first bearer being selected from the at least one bearer based on the mapping.

19. An apparatus in a base station in a radio access network (RAN), comprising:

a processor; and a memory, said memory containing instructions executable by said processor to cause said apparatus to perform operations to:

determine at least one cluster, wherein a cluster of the at least one cluster is defined with coverage smaller than a cell, located across cell edges of multiple cells and identified by a same identifier across the multiple cells, for delivering of a message received by a server from a source device, and wherein the cluster is further determined based on at least one of the following:
- a cell identification and a signal quality,
- a device type, and
- a service type;

obtain, from the server, a mapping between the cluster and at least one bearer;

obtain, from the server, a definition of the cluster to the RAN;

receive the message from the server over a first bearer, the first bearer being selected from the at least one bearer based on the mapping; and send the message to at least one terminal device within the cluster using the first bearer.

20. An apparatus in a terminal device, comprising:

a processor; and a memory, said memory containing instructions executable by said processor to cause said apparatus to perform operations to:

receive information for determining a bearer to be monitored for receiving a multicast message received by a server from a source device, wherein the multicast message is multicast to a configured cluster that is defined with coverage smaller than a cell, located across cell edges of multiple cells and identified by a same identifier across the multiple cells, for delivering of the multicast message, wherein the information includes a definition of the cluster sent by the server to a radio access network (RAN), and wherein the configured cluster is further determined based on at least one of the following:
- a cell identification and a signal quality,
- a device type, and
- a service type;

determine the bearer to be monitored based on the information; and receive the multicast message sent to the cluster over the determined bearer.

\* \* \* \* \*